United States Patent [19]

Kasper et al.

[11] Patent Number: 4,590,054

[45] Date of Patent: May 20, 1986

[54] PROCESS FOR PREPARING POLY(TETRAMETHYLENE ETHER) GLYCOL

[75] Inventors: William W. Kasper, Wilmington, Del.; Willard L. Quon, East Amherst; Timothy D. Van Domelen, Amherst, both of N.Y.

[73] Assignee: E. I. Du Pont de Nemours and Company, Wilmington, Del.

[21] Appl. No.: 776,861

[22] Filed: Sep. 16, 1985

Related U.S. Application Data

[62] Division of Ser. No. 644,436, Aug. 27, 1984.

[51] Int. Cl.$^4$ .................. C01F 7/50; C01B 17/45; C23F 11/04; C07C 43/11
[52] U.S. Cl. ...................... 423/467; 423/465; 423/468; 422/7; 568/617; 239/10
[58] Field of Search .................. 239/10; 406/197, 198; 252/387; 422/7, 12; 423/467, 468, 465; 568/617; 62/28

[56] References Cited

U.S. PATENT DOCUMENTS

| | | | |
|---|---|---|---|
| 2,430,963 | 11/1947 | Stephenson et al. | 423/467 |
| 2,447,476 | 8/1948 | Kulka | 423/467 |
| 3,957,959 | 5/1976 | Wheatley et al. | 423/467 |
| 4,115,408 | 9/1978 | Baker | 568/617 |

FOREIGN PATENT DOCUMENTS 449650  7/1948  Canada ................. 423/467

OTHER PUBLICATIONS

Corrosion and Deposits in Coal and Oil-Fired Boilers and Gas Turbines, American Society of Mechanical Engineers, New York, 1959.

*Primary Examiner*—Gary P. Straub
*Assistant Examiner*—Robert Kunemund

[57] ABSTRACT

The color level of poly(tetramethylene ether) glycol made by polymerizing tetrahydrofuran using fluosulfonic acid as the catalyst is significantly lower if the fluosulfonic acid contains no more than about 1200 ppm of iron sulfites.

2 Claims, No Drawings

PROCESS FOR PREPARING POLY(TETRAMETHYLENE ETHER) GLYCOL

This is a division of application Ser. No. 644/436, filed Aug. 27, 1984, now allowed.

DESCRIPTION

Technical Field

This invention relates to a method for preparing poly(tetramethylene ether) glycol (PTMEG) having a low level of color.

BACKGROUND AND SUMMARY OF THE INVENTION

PTMEG is a commodity in the chemical industry, widely used as a raw material in the preparation of polyurethanes.

One of the several methods of preparing PTMEG is the catalytic polymerization of tetrahydrofuran, using fluosulfonic acid (FSA) as the catalyst. PTMEG made this way sometimes has an undesirable yellow cast, which must be reduced or eliminated to meet most commercial specifications.

It has been found that this yellow cast is due, at least in part, to the presence of iron sulfites in the FSA. These sulfites are formed during shipment of the FSA in steel tanks by reaction of the steel's iron with the FSA's residual sulfur trioxide.

The yellow cast becomes apparent in the PTMEG when the iron sulfite concentration in the FSA used as catalyst is more than about 1200 ppm[1]. Preventing formation of the yellow cast is therefore a matter of bringing the iron sulfite content of the FSA to below that level before it is used.

[1]. As measured by standard iodometric oxidation of a sample sparged with nitrogen, followed by a titration with thiosulfate to determine the amount of iodine consumed, and thereby the amount of sulfite present.

The iron sulfite content can be brought to below 1200 ppm by conventional methods such as distillation but it is far easier, and therefore preferred, to prevent iron sulfite formation in the first place by eliminating the FSA's residual sulfur trioxide through reaction with water according to the equation $$SO_3 + H_2O \rightarrow H_2SO_4$$

DETAILED DESCRIPTION

The amount of water used of course depends on the FSA's $SO_3$ content. This is first determined by conductrometric titration with water. A stoichiometric amount of water is then added to the FSA so that all the $SO_3$ initially present is converted to sulfuric acid.

Since it is dangerous to add water directly to FSA, it is preferred to add it in the form of a 2-7% water/93-98% sulfuric acid mixture. This can take the form, if it is conveniently available, of "scrubber acid," which is a 5/95 mixture of water and sulfuric acid used to absorb fumes in the process of making FSA.

Since the iron sulfites form principally in steel shipping containers, it is most convenient to add the water during the loading operation, or directly afterward. It can of course be added earlier if this seems desirable.

Addition can be made quite conveniently by means of a dip tube, whereby the water is introduced below the surface of the FSA. The FSA is then stirred or otherwise agitated to insure mixing. In the normal case, movement of the container during shipping does this adequately.

FSA treated in this fashion can be used directly in the PTMEG polymerization, without any additional processing.

Those skilled in the art will be able to practice this invention more easily after referring to the following illustrative example.

These artisans will no doubt be able to compose numerous variations of the theme disclosed, such as changing the amounts of ingredients slightly but insignificantly from those shown, adding innocuous substances, or substituting equivalent or nearly equivalent components for those shown. All these variations are considered to be part of the inventive concept.

EXAMPLE 35960 liters of FSA containing 5000 ppm of sulfur trioxide were loaded into a railroad tankcar. 844 kg of scrubber acid (5% water and 95% sulfuric acid) were added by means of a dip tube.

At the end of the journey, the FSA was found to contain less than 1200 ppm of iron sulfite. PTMEG made using this FSA had an APHA color of less than 10.

We claim:

1. A method for reducing the formation of iron sulfite in fluosulfonic acid during shipment in steel containers, the method comprising adding about shoichiometric amount of water to the fluosulfonic acid, before shipment, to react with substantially all of the sulfur trioxide in the fluosulfonic acid.

2. The method of claim 1 wherein the water is added to the fluosulfonic acid in the form of a 2-7% water/93-98% sulfuric acid mixture.

* * * * *

UNITED STATES PATENT OFFICE
CERTIFICATE OF CORRECTION

PATENT NO. : 4,590,054
DATED : May 20, 1986
INVENTOR(S) : WILLIAM W. KASPER ET AL.

It is certified that error appears in the above—identified patent and that said Letters Patent are hereby corrected as shown below:

Column 2, line 45 between "about" and "shoichiometric" insert -- a --.

Column 2, line 45 "shoichiometric" should read -- stoichiometric--.

Signed and Sealed this

Twenty-sixth Day of August 1986

[SEAL]

Attest:

DONALD J. QUIGG

Attesting Officer

Commissioner of Patents and Trademarks